(12) United States Patent
Kobayashi

(10) Patent No.: US 6,396,407 B1
(45) Date of Patent: May 28, 2002

(54) METHOD FOR DISPLAYING RESIDUAL CAPACITY OF BATTERY, BATTERY PACK AND PORTABLE ELECTRIC DEVICE USING THE METHOD

(75) Inventor: Takashi Kobayashi, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/842,185

(22) Filed: Apr. 26, 2001

(51) Int. Cl.⁷ ................................................. G08B 21/00
(52) U.S. Cl. ..................... 340/636; 340/525; 340/693.2; 320/132; 320/134; 320/136
(58) Field of Search ................................ 340/636, 333, 340/525, 693.1, 693.2, 635; 320/127, 130, 132, 134, 136; 324/426, 427

(56) References Cited

U.S. PATENT DOCUMENTS

| | | | | |
|---|---|---|---|---|
| 5,028,859 A | * | 7/1991 | Johnson et al. | 320/15 |
| 5,656,919 A | * | 8/1997 | Proctor et al. | 320/30 |
| 5,668,461 A | * | 9/1997 | Hancock et al. | 320/35 |
| 5,870,025 A | * | 2/1999 | Hinohara | 340/636 |
| 5,982,147 A | * | 11/1999 | Anderson | 320/132 |
| 6,275,042 B1 | * | 8/2001 | Tsai | 324/427 |

* cited by examiner

Primary Examiner—Jeffery Hofsass
Assistant Examiner—Davetta W. Goins
(74) Attorney, Agent, or Firm—Wenderoth, Lind & Ponack, L.L.P.

(57) ABSTRACT

A secondary battery pack comprises a current detector for detecting charge current or discharge current of a secondary battery, a voltage detector for detecting voltage of the secondary battery, a temperature detector for measuring temperature of the secondary battery, a controller for calculating residual capacity of the secondary battery based on each parameter detected by each detector, and a display unit for displaying the calculated residual capacity. The display unit has at least two kinds of display states, and displays the residual capacity of the secondary battery using a ratio between respective display times of the two kinds of display states.

20 Claims, 4 Drawing Sheets

METHOD FOR DISPLAYING RESIDUAL CAPACITY OF BATTERY, BATTERY PACK AND PORTABLE ELECTRIC DEVICE USING THE METHOD

BACKGROUND OF THE INVENTION

1. Field of the Invention

The present invention relates to a secondary battery pack having a residual capacity display function, a portable electronic device having the residual capacity display function of the secondary battery, and a method for displaying residual capacity of the secondary battery.

2. Description of the Related Art

Conventionally, two-color light emitting diodes (LEDs) are generally used for displaying residual capacity of a secondary battery. For example, neither of the LEDs lights up when the secondary battery is not attached to a charger, an orange LED lights up during the charge thereof, and a green LED lights up in a full charge state. When a single-color LED is used, the LED does not light up when the secondary battery is not attached to the charger, flashes during the charge, and lights up in the full charge state to attain a same purpose.

When a user can know the residual capacity of the secondary battery in more detail, he/she can estimate an operating time of the device, and further an exchange timing of the secondary battery. Therefore, a portable electronic device with a built-in secondary battery is required to more precisely display the residual capacity of the secondary battery. For this purpose, a method is employed in which a large number of LEDs are used and number of lighting LEDs is increased or decreased depending on the residual capacity of the secondary battery.

The portable electronic device with the secondary battery can detect the residual capacity thereof and display it in detail using a large number of LEDs as discussed above. A secondary battery pack, however, singly, cannot precisely display the residual capacity, because it displays the residual capacity with a single LED as discussed above. When the user attaches the secondary battery pack to the portable electronic device to start up the device every time he/she intends to know the residual capacity in detail, a longer time is inconveniently spent for the charge.

As discussed above, a conventional residual-capacity displaying method using a single LED has a problem that the progress of the charge cannot be precisely recognized. When a plurality of LEDs are provided for indicating a charge state in more detail, a cost increases and larger power is consumed in the LEDs for displaying the residual capacity.

SUMMARY OF THE INVENTION

The present invention addresses the conventional problems discussed above. A secondary battery pack in accordance with the present invention comprises a secondary battery for supplying power to a portable electronic device, a controller for calculating residual capacity of the secondary battery, and a display unit for displaying the residual capacity. The display unit has at least two kinds of display states, and indicates the residual capacity of the secondary battery using a ratio between respective display times of the two kinds of display states.

A portable information device in accordance with the present invention comprises a secondary battery for supplying power to a portable electronic device, a controller for calculating residual capacity of the secondary battery, and a display unit for displaying the residual capacity. The display unit has at least two kinds of display states, and indicates the residual capacity of the secondary battery using a ratio between respective display times of the two kinds of display states.

A residual capacity displaying method of the secondary battery in accordance with the present invention comprises steps of calculating the residual capacity of the secondary battery, and displaying the residual capacity of the secondary battery using a ratio between respective display times of a first display element and a second display element that are different from each other in color.

DETAILED DESCRIPTION OF THE EXEMPLARY EMBODIMENTS

Embodiment 1

Figure 1:
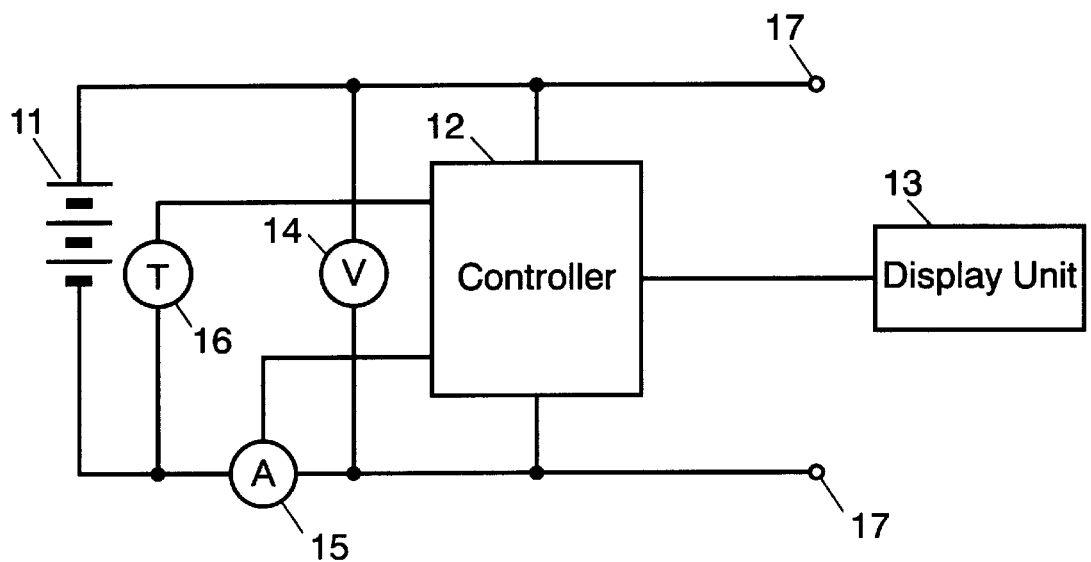
FIG. 1 is a schematic block diagram of a secondary battery pack in accordance with a first exemplary embodiment of the present invention.

Referring now to FIG. 1, there is shown a schematic block of a secondary battery pack in accordance with a first exemplary embodiment of the present invention. The secondary battery pack and a residual capacity display method of a secondary battery in accordance with the present invention will be described hereinafter with reference to FIG. 1.

The secondary battery pack of the present invention comprises the following elements:

secondary battery 11 comprising lithium ions;

voltage detector 14 for detecting voltage of secondary battery 11;

current detector 15 for detecting charge/discharge current of secondary battery 11;

temperature detector 16 for measuring temperature of secondary battery 11;

controller 12 for calculating residual capacity of secondary battery 11; and display unit 13 for displaying the residual capacity of secondary battery 11.

These elements are stored in one package and configure the secondary battery pack.

The secondary battery pack includes terminal 17 through which secondary battery 11 is charged or supplies power to a portable electronic device.

Secondary battery 11 is charged in response to CC-CV control. Controller 12 comprising a one-chip microcomputer performs the CC-CV control as followings. First, voltage detector 14 measures terminal voltage of secondary battery 11. When the terminal voltage is lower than a certain value, controller 12 controls a charge current so that current value detected by current detector 15 is constant. Next, when the charge progresses and the terminal voltage reaches a predetermined value, controller 12 gradually decreases the charge current, controls it so that the terminal voltage is constant, and continues the charge. When the charge current decreases below a certain value, controller 12 determines that the secondary battery is fully charged.

Because the terminal voltage depends on temperature, controller 12, during the charge, corrects the charge voltage or the charge current based on a temperature of the secondary battery measured by temperature detector 16. Controller 12, for preventing the secondary battery from overheating, also decreases the charge current before the secondary battery overheats. Once the secondary battery is fully charged, controller 12 records the full charge state and stops the charge.

Next, the residual capacity display of the secondary battery will be described. Voltage detector 14 and temperature detector 16 respectively measure terminal voltage and temperature of the secondary battery during the charge or the discharge. Current detector 15 measures charge/discharge current of secondary battery 11. Controller 12 accumulates discharge current measured by the current detector, and calculates residual capacity of the secondary battery on the basis of the accumulation result and the measured terminal voltage and temperature. Controller 12 then displays the residual capacity of the secondary battery on display unit 13.

Figure 3A:
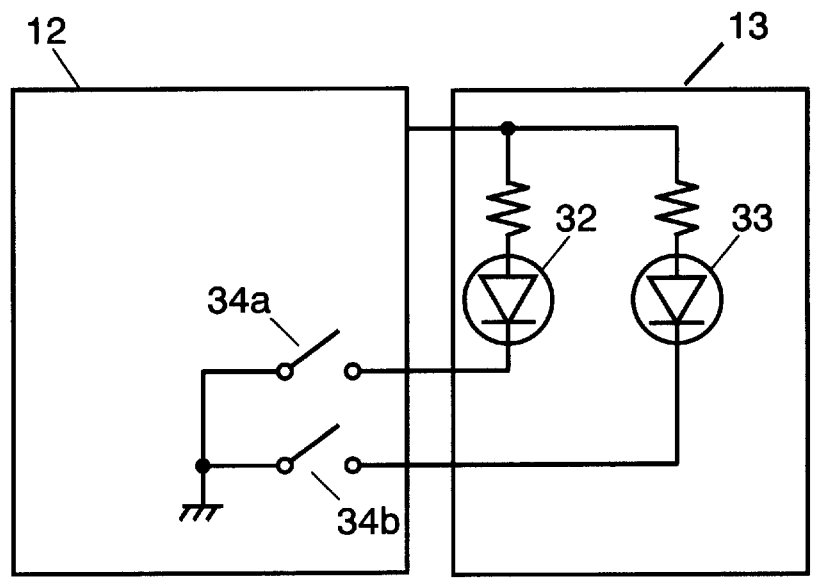
FIG. 3A and FIG. 3B are schematic block diagrams of display units in accordance with the present invention.

FIG. 3A is a schematic block diagram of display unit 13. Display unit 13 comprises LED 32 for emitting green light and LED 33 for emitting orange light. Controller 12 includes switches 34a, 34b for turning on or off respective LEDs. Controller 12 respectively turns on switches 34a, 34b to light the green LED and the orange LED based on the calculated residual capacity of secondary battery 11, and indicates the residual capacity of the secondary battery.

Figure 4A:
FIG. 4A through FIG. 4D are timing charts of flashings of LEDs for indicating residual capacity of a secondary battery in accordance with the present invention.
Figure 4B:
Figure 4C:
Figure 4D:

Referring now FIG. 4A through FIG. 4D, the residual capacity displaying method is specifically illustrated. FIG. 4A through FIG. 4D are timing charts for indicating the residual capacity of the secondary battery on a scale of 1 to 10. Emission of green light on a scale of 1 to 10 corresponds to a residual capacity of the secondary battery. For example, when the residual capacity is 80%, the green LED flashes for eight times as shown in FIG. 4A, and then the orange LED flashes for two times as shown in FIG. 4B. When, of 10 times of flashing in all, the green LED flashes for eight times, a user can recognize that the residual capacity is 80%. For example, when the residual capacity is 40%, the green LED flashes for four times as shown in FIG. 4C, and then the orange LED flashes for six times as shown in FIG. 4D. The user can recognize that the residual capacity is 40%. The flashing period may be set simply to a period at which light emission can be correctly recognized, preferably once a second or several times a second.

Figure 3B:
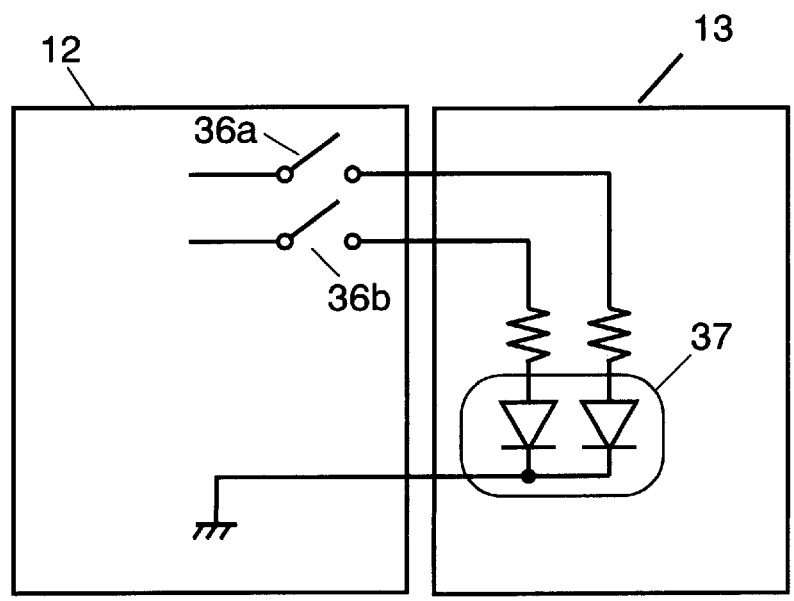

Additionally, as shown in FIG. 3B, display unit 13 may use an LED module 37 in which two green and orange LEDs are built in. Switches 36a, 36b of controller 12 for turning on or off the respective LEDs are configured as shown in FIG. 3B.

Since display unit 13 can be realized with two LEDs, it simply requires a smaller mounting space and is inexpensive.

The present embodiment has been described, but the display unit may be mounted not to a secondary battery pack but to a portable electronic device to which the secondary battery pack is attached. A controller, a voltage detector, a temperature detector, a current detector, and a display unit can be easily mounted not to the secondary battery pack but to the portable electronic device to which a secondary battery is attached.

Embodiment 2

Figure 2:
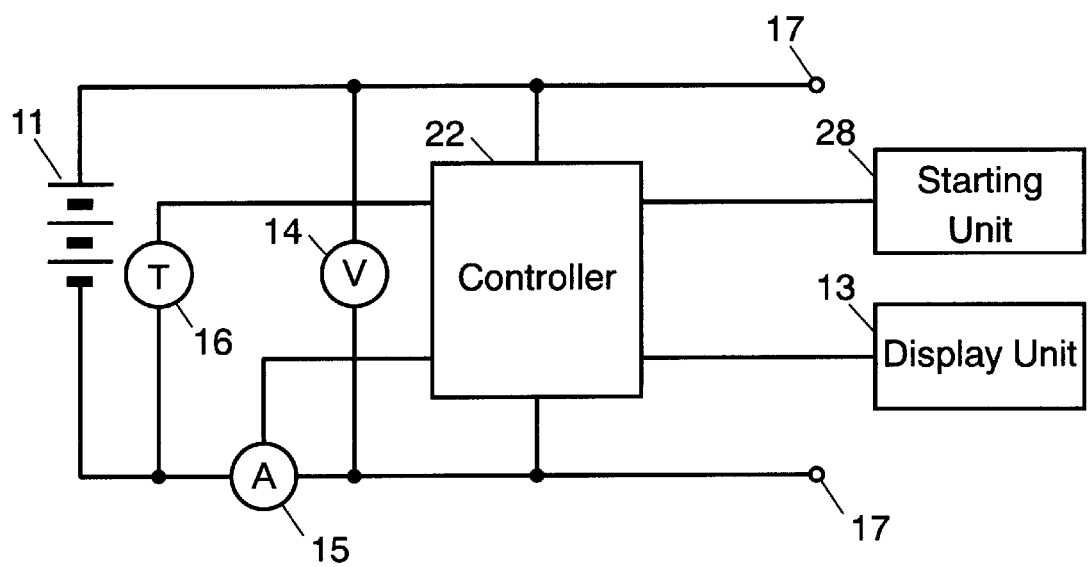
FIG. 2 is a schematic block diagram of a secondary battery pack in accordance with a second exemplary embodiment of the present invention.

Referring now to FIG. 2, a second exemplary embodiment of the present invention will be hereinafter described. A secondary battery pack in accordance with the present invention shown in FIG. 2 includes controller 22 instead of controller 12 of the secondary battery pack shown in FIG. 1, and further includes starting unit 28. Elements other than controller 22 and starting unit 28 are same as those described on the first embodiment and are denoted with the same reference numbers. Controller 22 controls charge of a secondary battery and calculates residual capacity thereof, similarly to controller 12 described in embodiment 1.

The secondary battery pack in accordance with the second embodiment will be hereinafter described focusing attention on differences from the first embodiment.

While an operator is pressing an operation button (not shown) to display the residual capacity, starting unit 28 continues outputting a display command signal. Starting unit 28 also outputs the display command signal when the secondary battery pack is attached to a portable electronic device.

Controller 22 displays the residual capacity on display unit 13 while the display command signal is outputted.

A specific displaying method is similar to that of embodiment 1. For example, when the residual capacity is 80%, the green LED flashes for eight times as shown, and then the orange LED flashes for two times. Since the residual capacity of secondary battery 21 is displayed only while the operation button is pressed, power consumed by the LEDs of display unit 23 can be reduced.

Controller 22 may also includes a timer. A display duration is previously set in the timer, and controller 22 displays the residual capacity on display unit 13 for the display duration after receiving the display command signal. The duration is specifically set so that the display unit displays the residual capacity once or twice. In this case, power consumption is reduced and operability is improved because a switch is automatically turned off after the display of the residual capacity for certain duration.

Means for electrically or mechanically detecting that the secondary battery pack is attached to the portable electronic device may be also used as starting unit so that upon the attachment of the secondary battery pack the residual capacity is displayed as discussed above.

The present embodiment has been described, but the display unit may be mounted not to a secondary battery pack but to a portable electronic device to which the secondary battery pack is attached. A controller, a voltage detector, a temperature detector, a current detector, a display unit, and starting unit can be easily mounted not to the secondary battery pack but to the portable electronic device to which a secondary battery is attached.

Embodiment 3

Figure 5:
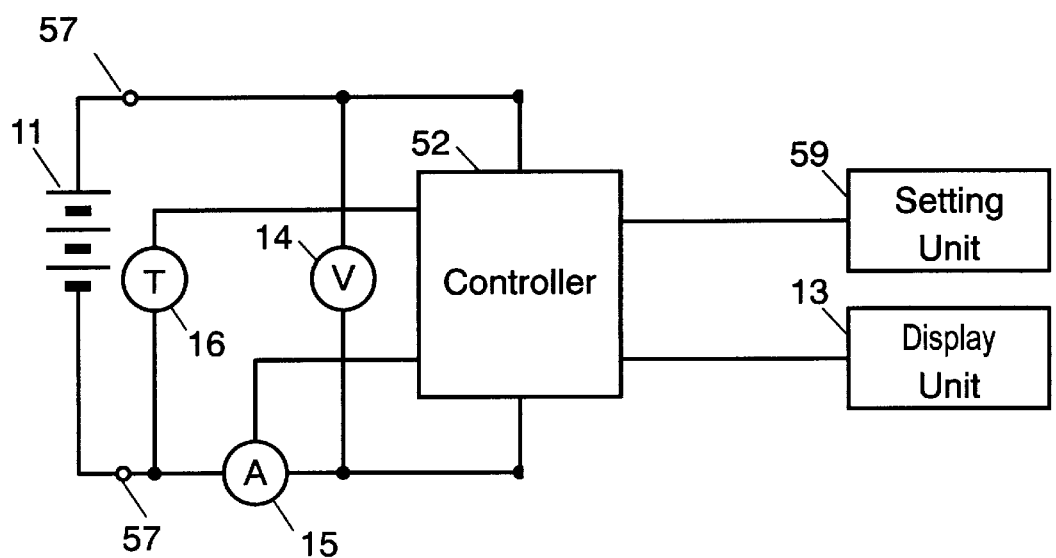
FIG. 5 is a block diagram of a main part of a portable electronic device in accordance with a third exemplary embodiment of the present invention.

Referring now to FIG. 5, a third exemplary embodiment of the present invention will be hereinafter described. FIG. 5 is a block diagram of a main part of a portable electronic device in accordance with the third exemplary embodiment of the present invention.

A secondary battery pack comprises secondary battery 11 comprising lithium ions. The secondary battery pack has terminal 57 used for performing charge or discharge of the secondary battery pack. The secondary battery pack is attached to the portable electronic device and supplies power through terminal 57.

The body (not shown) of the portable electronic device comprises the following elements:

voltage detector 14 for detecting voltage of secondary battery 11;

current detector 15 for detecting charge/discharge current of secondary battery 11;

temperature detector 16 for measuring temperature of secondary battery 11;

controller 52 for calculating residual capacity of secondary battery 11;

display unit 13 for displaying the residual capacity of secondary battery 11; and setting unit 59 for setting a using time of the portable electronic device.

In FIG. 5, same elements used in embodiment 1 are denoted with the same reference numbers as in FIG. 1, and are not described. Controller 52 controls charge of the secondary battery and calculates the residual capacity thereof, similarly to controller 12 described in embodiment 1.

The secondary battery pack in accordance with the third embodiment will be hereinafter described focusing attention on differences from the first embodiment.

A user sets a desired residual capacity value with setting unit 59. The value set by setting unit 59 are fed into controller 52. When the portable electronic device is used away from home for, for example, two hours, the expected using time of two hours is fed into a setting unit. Controller 52 calculates a required residual capacity in response to the expected using time.

Controller 52 performs the following operations:

(1) lighting up an orange LED of display unit 13 when the residual capacity of secondary battery 11 is insufficient;

(2) flashing orange and green LEDs of display unit 13 when the residual capacity of secondary battery 11 exceeds the required residual capacity; and (3) lighting up the green LED of display unit 13 when secondary battery 11 is filly charged.

The present embodiment has been described, but the controller, the voltage detector, the temperature detector, the current detector, the display unit, setting unit, and secondary battery 11 shown in FIG. 5 can be easily configured as the secondary battery pack.

What is claimed is:

1. A secondary battery pack comprising:
a secondary battery for supplying power to a portable electronic device;
a controller for calculating residual capacity of said secondary battery; and
a display unit for displaying the residual capacity of said secondary battery, said display unit being controlled by said controller,
wherein said display unit has at least two kinds of display states and indicates the residual capacity of said secondary battery using a ratio between respective display times of the two kinds of display states.

2. The secondary battery pack according to claim 1 further comprising;
a voltage detector for detecting terminal voltage of said secondary battery;
a current detector for detecting charge/discharge current of said secondary battery; and
a temperature detector for measuring temperature of said secondary battery,
wherein said controller calculates the residual capacity of said secondary battery using the terminal voltage, the charge/discharge current, and the temperature detected by said voltage detector, said current detector, and said temperature detector.

3. The secondary battery pack according to claim 1, wherein said display unit comprises two light emitting diodes having different color.

4. The secondary battery pack according to claim 2 further comprising starting unit,
wherein said display unit displays the residual capacity of said secondary battery based on a display command signal from said starting unit.

5. The secondary battery pack according to claim 4, wherein said display unit displays the residual capacity of said secondary battery while said starting unit is outputting the display command signal .

6. The secondary battery pack according to claim 4, wherein said display unit, when said starting unit outputs the display command signal, displays the residual capacity for a predetermined time, and stops displaying the residual capacity after the predetermined time.

7. A portable electronic device comprising:
a secondary battery f or supplying power to said portable electronic device;
a controller for calculating residual capacity of said secondary battery; and
a display unit for displaying the residual capacity of said secondary battery, said display unit being controlled by said controller,
wherein said display unit has at least two kinds of display states and indicates the residual capacity of said secondary battery using a ratio between respective display times of the two kinds of display states.

8. The portable electronic device according to claim 7 further comprising;
a voltage detector for detecting terminal voltage of said secondary battery;
a current detector for detecting charge/discharge current of said secondary battery; and
a temperature detector for measuring temperature of said secondary battery,
wherein said controller calculates the residual capacity of said secondary battery using the terminal voltage, the charge/discharge current, and the temperature detected by said voltage detector, said current detector, and said temperature detector.

9. The portable electronic device according to claim 7, wherein said display unit comprises two light emitting diodes having different color.

10. The portable electronic device according to claim 8 further comprising starting unit,
wherein said display unit displays the residual capacity of said secondary battery based on a display command signal from said starting unit.

11. The portable electronic device according to claim 10, wherein said display unit displays the residual capacity of said secondary battery while said starting unit is outputting the display command signal.

12. The portable electronic device according to claim 10, wherein said display unit, when said starting unit outputs the display command signal, displays the residual capacity for a predetermined time, and stops displaying the residual capacity after the predetermined time.

13. The portable electronic device according to claim 8 further comprising setting unit for setting a desired residual capacity of said secondary battery, wherein said controller compares the calculated residual capacity of said secondary battery with the value set by setting unit, and based on the comparison result, said display unit selects and displays the two kinds of display states.

14. The portable electronic device according to claim 13, wherein said setting unit sets a desired operating time of said portable electronic device.

15. A residual capacity displaying method of a secondary battery comprising the steps of:
   (a) calculating a residual capacity of the secondary battery; and
   (b) displaying the residual capacity of the secondary battery using a ratio between respective display times of a first display element and a second display element that are different from each other in color.

16. The residual capacity displaying method according to claim 15 further comprising the steps of:
   (c) detecting terminal voltage of the secondary battery;
   (d) detecting charge/discharge current of the secondary battery; and
   (e) detecting temperature of the secondary battery,
   wherein the residual capacity of the secondary battery is calculated in step
   (a), using the voltage, the current, and the temperature respectively detected in steps (c), (d), and (e).

17. The residual capacity displaying method according to claim 16 further comprising the step of
   (f) generating a display command signal,
   wherein the residual capacity of the secondary battery is displayed in response to the display command signal in step (b).

18. The residual capacity displaying method according to claim 17,
   wherein step (b) is performed while the display command signal is generated.

19. The residual capacity displaying method according to claim 17,
   wherein when step (f) is performed, the residual capacity is displayed for a predetermined time and the display of the residual capacity is stopped after the predetermined time in step (b).

20. The residual capacity displaying method according to claim 16 further comprising the steps of
   (g) setting a desired residual capacity of the secondary battery; and
   (h) comparing the desired residual capacity set in step (g) with the residual capacity calculated in step (a),
   wherein, in step (b), the first display element and the second display element are selected and lit up in response to the comparison result in step (h).

* * * * *